US010659764B2

(12) United States Patent
Horesh

(10) Patent No.: US 10,659,764 B2
(45) Date of Patent: May 19, 2020

(54) DEPTH IMAGE PROVISION APPARATUS AND METHOD

(71) Applicant: Intel Corporation, Santa Clara, CA (US)

(72) Inventor: Nizan Horesh, Caesarea (IL)

(73) Assignee: Intel Corporation, Santa Clara, CA (US)

(*) Notice: Subject to any disclaimer, the term of this patent is extended or adjusted under 35 U.S.C. 154(b) by 806 days.

(21) Appl. No.: 15/187,738

(22) Filed: Jun. 20, 2016

(65) Prior Publication Data
US 2017/0366801 A1 Dec. 21, 2017

(51) Int. Cl.
H04N 13/254 (2018.01)
H04N 13/296 (2018.01)
G01B 11/25 (2006.01)

(52) U.S. Cl.
CPC ....... H04N 13/254 (2018.05); G01B 11/2513 (2013.01); G01B 11/2527 (2013.01); H04N 13/296 (2018.05)

(58) Field of Classification Search
CPC ............... H04N 13/02; H04N 13/0253; H04N 13/0296; H04N 13/254; H04N 13/296; G01B 11/2513; G01B 11/2527
USPC ...................... 348/46, 47, 51, 135
See application file for complete search history.

(56) References Cited

U.S. PATENT DOCUMENTS 6,664,537 B2    12/2003  Engelhardt et al.
7,103,212 B2*    9/2006  Hager ...................... G06K 9/32
                                                            382/154
7,259,777 B2     8/2007  Retschke et al.
7,573,022 B2     8/2009  Choo et al.
7,756,323 B2     7/2010  Kimmel
9,467,680 B2    10/2016  Kimmel et al.
9,683,837 B2*    6/2017  Siercks .............. G01B 11/2513
(Continued)

FOREIGN PATENT DOCUMENTS

CN      1308837 A     8/2001
CN    101995657 A     3/2011
(Continued)

OTHER PUBLICATIONS

Fourth Office Action dated Nov. 6, 2017 issued in related Chinese Patent Application No. 201380033389.3, 39 pages.
(Continued)

Primary Examiner — Trang U Tran
(74) Attorney, Agent, or Firm — Schwabe, Williamson & Wyatt, P.C.

(57) ABSTRACT

Apparatuses, methods and storage media for providing a depth image of an object are described. In some embodiments, the apparatus may include a projector to project a light pattern on an object, and to move the projected light pattern over the object, to swipe the object with the light pattern, and a camera coupled with the projector. The camera may include a dynamic vision sensor (DVS) device, to capture changes in at least some image elements that correspond to an image of the object, during the swipe of the object with the light pattern. The apparatus may further include a processor coupled with the projector and the camera, to generate a depth image of the object, based at least in part on the changes in the at least some image elements. Other embodiments may be described and claimed.

20 Claims, 5 Drawing Sheets

(56) References Cited

U.S. PATENT DOCUMENTS

| | | | |
|---|---|---|---|
| 9,800,795 | B2 | 10/2017 | Zabatani et al. |
| 2005/0174579 | A1 | 8/2005 | Notni et al. |
| 2007/0115484 | A1 | 5/2007 | Huang et al. |
| 2008/0278566 | A1 | 11/2008 | Towner et al. |
| 2009/0262363 | A1 | 10/2009 | Keshavmurthy et al. |
| 2010/0067007 | A1 | 3/2010 | Vedeen et al. |
| 2010/0067554 | A1 | 3/2010 | Wysocki et al. |
| 2010/0207938 | A1 | 8/2010 | Yau et al. |
| 2011/0025860 | A1 | 2/2011 | Katougi et al. |
| 2011/0057930 | A1 | 3/2011 | Keller et al. |
| 2011/0134499 | A1 | 6/2011 | Konno et al. |
| 2012/0001961 | A1 | 1/2012 | Nishikawa et al. |
| 2012/0200829 | A1 | 8/2012 | Bronstein et al. |
| 2012/0262553 | A1 | 10/2012 | Chen et al. |
| 2013/0001834 | A1 | 1/2013 | El-Siblani et al. |
| 2013/0083384 | A1 | 4/2013 | Yamagata et al. |
| 2013/0141734 | A1 | 6/2013 | Aoki |
| 2014/0002337 | A1 | 1/2014 | Bandringa et al. |
| 2014/0125994 | A1 | 5/2014 | Kim et al. |
| 2014/0240492 | A1 | 8/2014 | Lee |
| 2014/0307057 | A1 | 10/2014 | Kang et al. |
| 2015/0161818 | A1 | 6/2015 | Komenczi et al. |
| 2015/0172435 | A1 | 6/2015 | Kimmel |
| 2015/0198800 | A1 | 7/2015 | Freedman |
| 2015/0292863 | A1 | 10/2015 | Furihata et al. |
| 2015/0371393 | A1 | 12/2015 | Ramachandra et al. |
| 2016/0006914 | A1 | 1/2016 | Neumann |
| 2016/0373727 | A1 | 12/2016 | Kimmel et al. |

FOREIGN PATENT DOCUMENTS

| | | |
|---|---|---|
| CN | 201974159 U | 9/2011 |
| CN | 103033143 A | 4/2013 |
| CN | 103066487 A | 4/2013 |
| JP | 2003061936 A | 3/2003 |
| JP | 2003329955 A | 11/2003 |
| JP | 2007-010354 A | 1/2007 |
| JP | 2012202803 A | 10/2012 |
| KR | 1020100051139 A | 5/2010 |
| KR | 10-1541805 B1 | 8/2015 |
| TW | 479444 B | 3/2002 |
| WO | 2009124118 A1 | 10/2008 |
| WO | 2013054814 A1 | 4/2013 |
| WO | 2015184308 A1 | 12/2015 |

OTHER PUBLICATIONS

Non-Final Office Action dated Jan. 26, 2018, issued in related U.S. Appl. No. 15/190,031, 42 pages.

International Search Report and Written Opinion dated Mar. 21, 2014 for International Application No. PCT/US2013/048611, 12 pages.

TW Office Action for TW Application No. 103119562, dated Jun. 25, 2015, 13 pages.

First Office Action dated Feb. 19, 2016, issued in corresponding Chinese Patent Application No. 201380033389.3, 8 pages.

International Preliminary Report on Patentability dated Jan. 7, 2016, issued in corresponding International Application No. PCT/US2013/048611, 9 pages.

Notice of Preliminary Rejection dated May 17, 2016, issued in corresponding Korean Patent Application No. 2014-7036593, 20 pages.

International Search Report for PCT Application No. PCT/US2014/066460, dated Mar. 13, 2015, 15 pages.

O. Rubinstein, et al.,3D color video camera, InProc. of Workshop on 3D Digital Imaging and Modeling( 3DIM), 2009.

Milanovic et al., "Memseye for Optical 3D Tracking and Imaging Applications", Transducers 2011 Conference, Jun. 5-9, 2011, Beijing, China, 4 pages.

Lecture 16. Stereo and 3D Vision. © UW CSE vision faculty, https://courses.cs.washington.edu/courses/cse455/09wi/ . . . /lect16.pdf., <<last visited Jun. 20, 2016,>> 53 pages.

Developing for the Intel® RealSense™Camera (SR300), https://software.intel.com/en-us/realsense/sr300camera,<<last visited May 9, 2016>> 3 pages.

Notice of Reason(s) for Rejection dated Dec. 15, 2015, issued in corresponding Japanese Patent Application No. 2015-524290, 6 pages.

Communication pursuant to Article 94(3) EPC, dated Apr. 5, 2017, issued in corresponding European Patent Application No. 13888254.3, 5 pages.

International Preliminary Report on Patentability dated Jan. 3, 2019 for International Patent Application No. PCT/US2017/032982; 12 pages.

International Search Report & Written Opinion, dated Aug. 18, 2017, issued in related International Application No. PCT/US2017/032982 16 pages.

International Search Report & Written Opinion, dated Jul. 24, 2017, issued in related International Application No. PCT/US2017/032543 14 pages.

Inilabs, Dynamic Vision Sensor <<http://inilabs.com/products/dynamic-vision-sensors/>> last visited Jul. 27, 2016, 7 pages.

Lecture 09: Stereo Algorithms, Robert Collins, Robert Collins, <<http://www.cse.psu.edu/~rtc12/CSE486/lecture09.pdf>>, last visited Jul. 27, 2016.

Non-Final Office Action dated Mar. 28, 2016, issued in related U.S. Appl. No. 14/104,242, filed Dec. 12, 2013.

Notice of Allowance dated Jun. 16, 2016, issued in related U.S. Appl. No. 14/104,242, filed Dec. 12, 2013.

Non-Final Office Action dated Dec. 18, 2015, issued in related U.S. Appl. No. 14/128,915, filed Dec. 23, 2013.

Final Office Action dated Apr. 29, 2016, issued in related U.S. Appl. No. 14/128,915, filed Dec. 23, 2013.

International Preliminary Report on Patentability dated Jun. 23, 2016, issued in corresponding International Application No. PCT/US2014/066460.

Non-Final Office Action dated Oct. 24, 2016, issued in corresponding U.S. Appl. No. 15/251,578, 12 pages.

Second Office Action dated Oct. 10, 2016, issued in corresponding Chinese Patent Application No. 201380033389.3.

Notice of Final Rejection dated Nov. 24, 2016, issued in corresponding Korean Patent Application No. 2014-7036593.

Supplementary European Search Report dated Dec. 23, 2016, issued in corresponding European Patent Application No. 13888254.3, 10 pages.

Non-Final Office Action dated Oct. 6, 2016, issued in corresponding U.S. Appl. No. 14/128,915, 54 pages.

Third Office Action dated Apr. 28, 2017, issued in related Chinese Patent Application No. 201380033389.3, 42 pages.

Notice of Dismissal of Amendment dated Jan. 23, 2017, in corresponding Korean Patent Appln. No. 2014-7036593, 10 pages.

Roger Y. Tsai, "A versatile Camera Calibration Technique for High-Accuracy 3D Machine Vision Metrology Using Off-the-Shelf TV Cameras and Lenses," IEEE Journal of Robotics and Automation, vol. RA-3, No. 4, Aug. 1987, pp. 323-344.

Notice of Allowance dated Feb. 1, 2017, issued in related U.S. Appl. No. 14/128,915 16 pages.

Notice of Allowance dated Mar. 17, 2017, issued in related U.S. Appl. No. 14/128,915, 13 pages.

Office Action dated Aug. 21, 2019 for U.S. Appl. No. 15/190,031, 32 pages.

* cited by examiner

DEPTH IMAGE PROVISION APPARATUS AND METHOD

TECHNICAL FIELD

The present disclosure relates to the field of computing, and in particular, to apparatuses, methods and storage media associated with provision of depth images.

BACKGROUND

Current three-dimensional (3D) depth cameras include a conventional camera, an infrared laser projector, and an infrared camera (and sometimes a microphone array) to measure depth of an image, to enable gesture-based interaction, face recognition, immersive video conferencing and collaboration, gaming, and 3D scanning. The infrared projector may project a grid (in infrared light, which is invisible to human eye) onto the scene and the infrared camera may record it to compute depth information. 3D cameras may be stand-alone or may be integrated into computers, such as desktops, laptops, tablets, 2-in-1 computers, and the like. Current depth cameras, when in use, may require substantial energy consumption from an imager and processing units. For example, current 3D cameras may need to repeatedly capture numerous images (e.g., about ten or so total) to produce a single depth image with desired precision.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

DETAILED DESCRIPTION

Embodiments of the present disclosure include techniques and configurations for an apparatus and method for providing a depth image of an object. In some embodiments, the apparatus may include a projector to project a light pattern on an object, and to move the projected light pattern over the object, to swipe the object with the light pattern, and a camera coupled with the projector. The camera may include a dynamic vision sensor (DVS) device, to capture changes in at least some image elements that correspond to an image of the object, during the swipe of the object with the light pattern. The apparatus may further include a processor coupled with the projector and the camera, to generate a depth image of the object, based at least in part on the changes in the at least some image elements.

In the following detailed description, reference is made to the accompanying drawings, which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

For the purposes of the present disclosure, the phrase "A and/or B" means (A), (B), (A) or (B), or (A and B). For the purposes of the present disclosure, the phrase "A, B, and/or C" means (A), (B), (C), (A and B), (A and C), (B and C), or (A, B, and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

The term "coupled with," along with its derivatives, may be used herein. "Coupled" may mean one or more of the following. "Coupled" may mean that two or more elements are in direct physical, electrical, or optical contact. However, "coupled" may also mean that two or more elements indirectly contact each other, but yet still cooperate or interact with each other, and may mean that one or more other elements are coupled or connected between the elements that are said to be coupled with each other.

Figure 1:
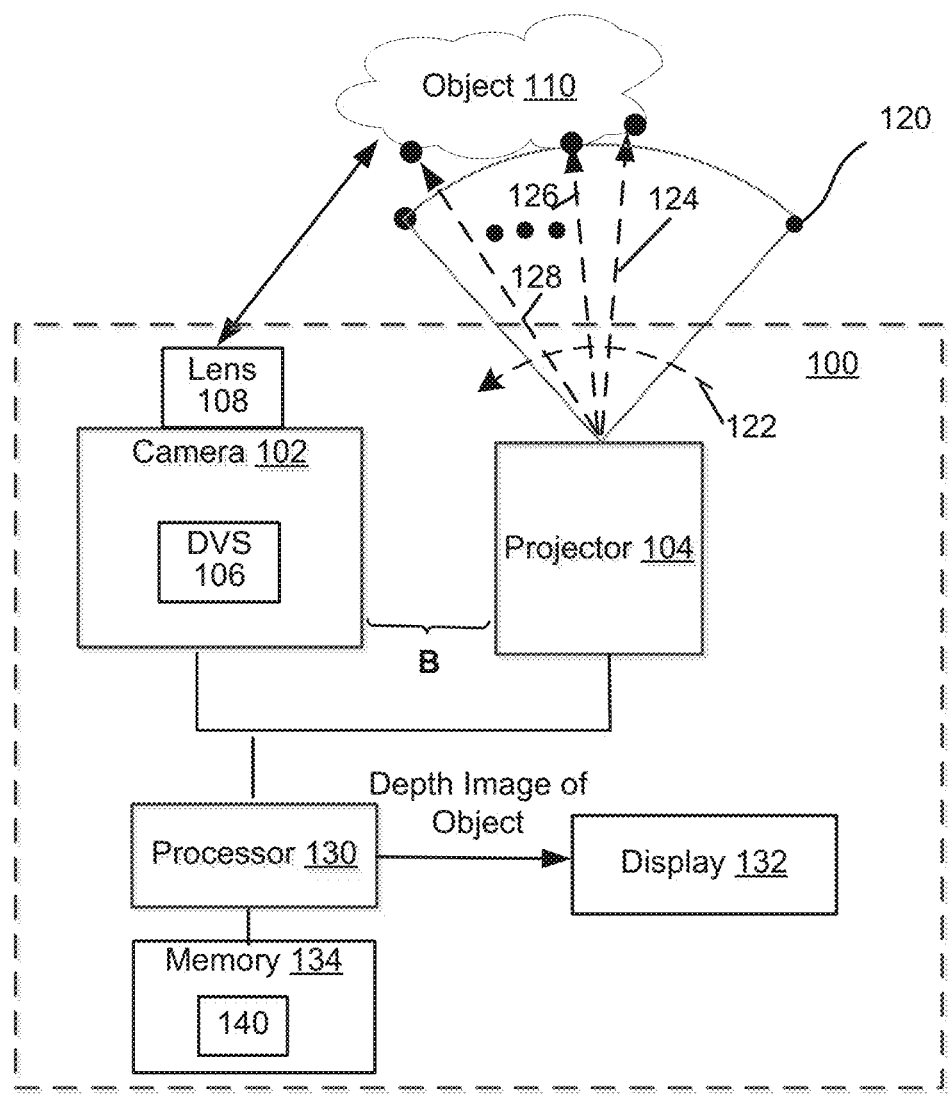
FIG. 1 is a block diagram illustrating an example apparatus for provision of a depth image of an object, in accordance with various embodiments.

FIG. 1 is a block diagram illustrating an example apparatus for provision of a depth image of an object, in accordance with various embodiments. In embodiments, the apparatus 100 may include a camera 102 coupled with a projector 104. The camera 102 may comprise an infrared (IR) camera or a regular camera. The camera 102 may include a dynamic vision sensor (DVS) device 106 and an imaging lens 108. The DVS device 106 may be composed from an array of photosensitive locations (image elements). In some embodiments, a photosensitive location of the DVS device 106 may comprise a pixel.

The imaging lens 108 may relay an image of an object 110 in the scene surrounding the apparatus 100 onto the DVS device 106. In other words, an image of the object 110 may be created on the DVS device 106, in the optical sense. In the embodiments described herein, the image of the object 110 may be provided to the DVS device 106 in response to a scan (swap) of the object 110 with a light pattern provided by the projector 104.

The DVS device 106 may capture and store, independently and/or asynchronously, and dynamically (e.g., in real- or near-real time), those of the photo-sensitive image elements of the relayed image whose characteristics (light intensity, light level, or contrast) may have changed by a pre-defined value. Based on the DVS device-provided image data, a depth image of an object may be generated. The generated depth image of the object 110 may comprise image elements (pixels), including those whose characteristics (e.g., light intensity, light level, or contrast) have been determined to change beyond a predetermined threshold. The creation of the depth image of the object using the DVS device is described below in detail.

In embodiments, the projector 104 may be configured to generate a light pattern and project a light pattern on the object 110. In general, the projector 104 may be configured to project the light pattern on the entire scene with the object 110 (i.e., the area within the field of view of the camera 102).

In embodiments, the light pattern may comprise a substantially one-dimensional shape. In general, a light pattern may be distinct in one (e.g., horizontal) direction. In other words, for every horizontal value x the pattern may have essentially one vertical value y. For example, the pattern may be a single straight line 120 shown in FIG. 1, where each dot represents the line position at different times, where the line 120 is perpendicular to the plane of FIG. 1. In another example, the pattern may comprise a non-straight, e.g., a curved, continuous line (not shown). In embodiments, the projector 104 may comprise a line projector using a tiltable micro-electromechanical system (MEMS) mirror configured to tiltably reflect a light line provided by a light source (e.g., a laser coupled with a cylindrical lens, not shown). In general, the projector 104 may include any projector configured to move the pattern (e.g., horizontally) in a substantially continuous manner. The projector 104 may be caused to move the projected light pattern (e.g., line 120) over the object 110, to swipe the object 110 with the light pattern. For example, the projector 104 may move the light pattern in one direction, as indicated by a dashed arrow 122. The line movement may occur in a controlled manner, to have at least one complete swipe of the object 104, as shown by dashed arrows 124, 126, 128.

The projector 104 may be synchronized with the camera 102, for example, the projector 104 and camera 102 may be provided with a common start time for a swipe cycle. Accordingly, the direction of the light pattern projected onto the object 110 may be known at every instant of time. As the projector 104 moves the light pattern (e.g., line 120) over the object 104, the imaging lens 108 may image the object 104 on the DVS device 106. The DVS device 106 may capture changes in at least some image elements that correspond to an image of the object 104, during the swipe of the object 104 with the light pattern. The image elements data (e.g., a stream of pixels) may be stamped with a time stamp and provided to a processor 130 coupled with the projector 104 and camera 102, for processing and generation of a depth image of the object 110. A single swipe of the object 110 may be sufficient to provide the depth image of the image of the object 110, in contrast to existing solutions, which may require ten or more swipes.

The processor 130 may generate a depth image of the object, based at least in part on the changes in the image elements, and further based on a location of the projector 104 relative to the camera 102 (shown in FIG. 1 as baseline distance B between the projector 104 and camera 102). It should be noted that FIG. 1 represents a co-planar setup of the projector and the camera. This may be done without loss of generality, since the image may be rectified and made it co-planar. The processes of rectification may include geometrical transformation of the image, according to the geometry of the camera-projector system. The result of this process may be a virtual camera that is co-planar and distortion free. In embodiments, the depth data of each provided pixel (e.g., a distance from the camera 102 to a point on the object 104 that corresponds to the provided pixel) may be triangulated based on the baseline distance B between the projector 104 and camera 102 and the depth image may be created accordingly. (The example calculation of the depth data for the object image is discussed in detail in reference to FIG. 2.) The resulting depth image of the object 110 may be provided to a display 132 and/or stored in a memory 134 of the apparatus 100, depending on a configuration of the apparatus 100.

The processor 130 may be configured to perform a control of the operation of the camera 102 and projector 104 for provision of the depth image of the object. The memory 134 may store instructions (e.g., in a control module 140) for operating the processor 130 to perform the provision of the depth image of the object 110 as described above. Specifically, the processor 130 may operate the control module 140 to synchronize the swipe cycle of the camera 102 and projector 104, control the swipe of the object 110 with the light pattern, and process the image element data provided by the DVS device 106 during the swipe, to generate the depth image of the object 110.

The apparatus 100 may be embodied as any external peripheral device (e.g., communicatively coupled with a computing device) or integrated device suitable for image generation and provision. The examples of computing devices that may include the apparatus 100 may include, but are not limited to, tablet computers, smartphones, laptops, gaming and media devices, mobile workstations, all-in-one devices, 2-in-1 devices, or desktop computers. In embodiments, the apparatus 100 may comprise a stand-alone device, such as a 3D still camera, a video camera, a webcam, an infrared (IR) camera or other device capable of generating video and/or images.

In general, any or all of the illustrated components of the apparatus 100 may be separate from and remote to, but communicatively coupled with, a computing device. Further, some or all of the functionalities of the apparatus 100, such as processing power and/or memory capacity may be used or shared with an associated computing device.

The described embodiments provide for numerous advantages compared to conventional solutions. For example, the described apparatus for provision of depth image may be more energy efficient than conventional solutions, because only a single swipe of object with the light pattern may be needed to create a depth image. In contrast, conventional solutions may require multiple (e.g., about ten or more) swipes. The depth image provided by the apparatus described herein may be more resistant to motion since its creation may require a single swipe, compared to multiple swipes and multiple resulting images provided by existing solutions.

Further, the depth image calculation may require simplified processing, with low latency, compared to existing solutions. In existing solutions, the image data may be accumulated as a result of multiple swipes, and then the depth image may be computed based on accumulated data. In the described embodiments, depth data may be computed dynamically, as soon as the image element (pixel) information is acquired.

Figure 2:
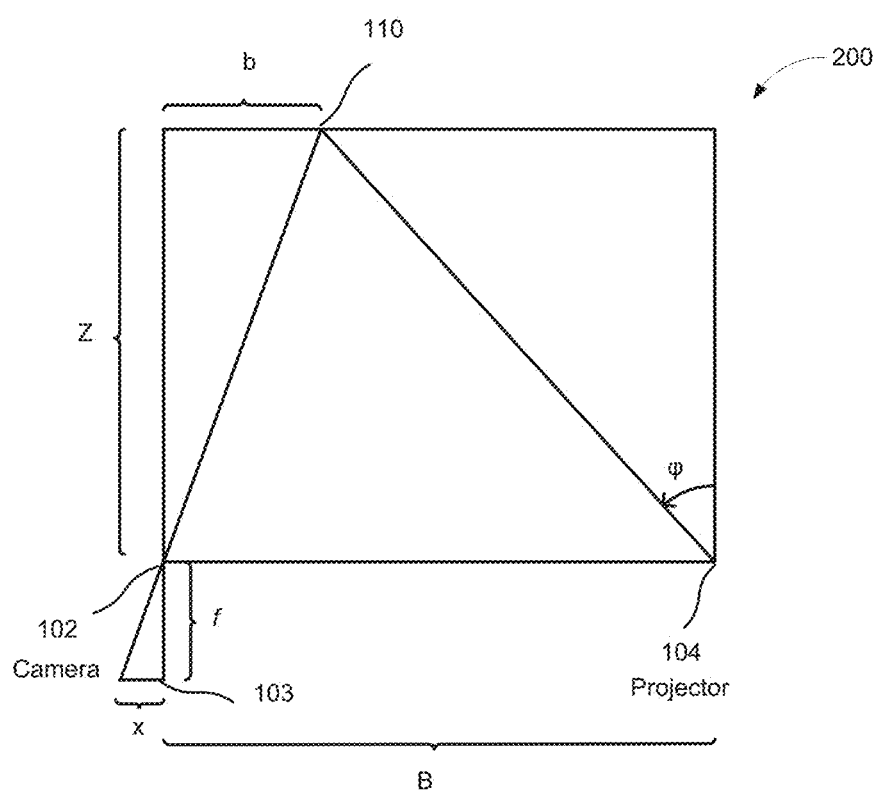
FIG. 2 is an example schematic diagram illustrating some aspects of obtaining a depth image of an object provided by the apparatus of FIG. 1, in accordance with some embodiments.

Further, the embodiments described herein provide for high dynamic range due to the DVS device high dynamic range. Thus, the camera may work substantially simultaneously in close distance to the object, where the pattern intensity (and therefore the image intensity) is high, and in long distance to the object where the pattern intensity is low. FIG. 2 is an example schematic diagram illustrating some aspects of obtaining a depth image of an object provided by the apparatus of FIG. 1, in accordance with some embodiments. For ease of understanding, like components of FIGS. 1 and 2 are indicated by like numerals.

In the diagram 200, b is the horizontal distance from the camera 102's entrance pupil (hereinafter, for ease of understanding, "distance from the camera 102") to the object 110, f is the focal length of the camera 102, B is the baseline distance between the camera 102 and the projector 104, x is the distance of the image object 110 from the camera principle point 103 in the image plane, φ is the angle between the projected line pattern direction and the z direction, in the x-z plane, and Z is the distance to the object 110 from the camera 102. It may be shown that Z may be calculated as follows:

$$Z=(f*B)/(x+f*\tan(\varphi)).$$

As discussed, the DVS device of the camera 102 may output a stream of image element data (pixel events), where each event may represent a change in a pixel light intensity or contrast. It may be assumed, without loss of generality, that the data represents transition from low to high contrast in an image element. An image element with changed characteristics may be identified as having coordinates (x, y, t), where t is time of the image element identification. The depth of the image for this image element (e.g., distance from the camera to the object 110 for the image element) may be calculated as follows:

$Z=(f*B)/(x+f*\tan(\varphi t))$, where φt is the angle between the projected line pattern direction and the z direction, in the x-z plane at the time t, e.g., identifying a projected pattern location as a function of time.

Because the light pattern (e.g., line) traverses the scene though the field-of-view, every image element (pixel) in the image projected on the DVS device of the camera 102 may be illuminated by the projector 104, when the projected line crosses that pixel (except areas where the projector is occluded). Thus, every swipe of object 110 with the light pattern provided by the projector 104 may result in a dense depth image of the object 110. The depth calculations may be reported asynchronously, and thus may create very low latency depth data.

Figure 3:
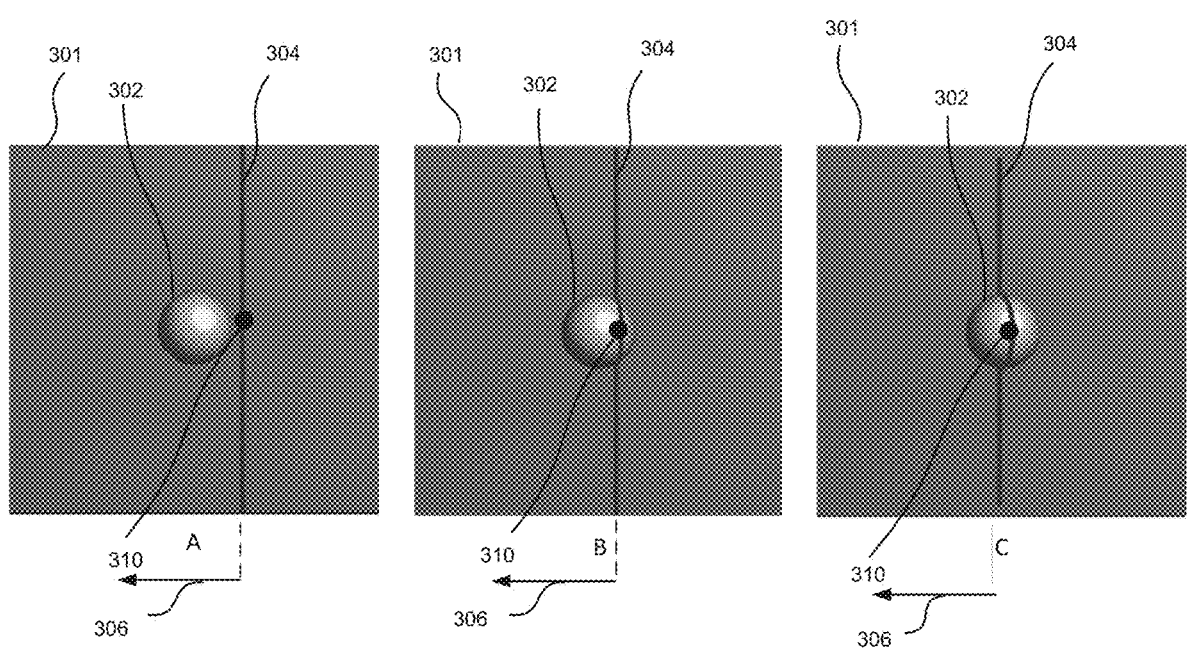
FIG. 3 illustrates example views of a swipe of an object with a light pattern by the projector of the apparatus of FIG. 1, in accordance with some embodiments.

FIG. 3 illustrates example views of a swipe of an object with a light pattern by the projector of the apparatus of FIG. 1, in accordance with some embodiments. The example object comprises a sphere 302 placed in a scene 301. The views of FIG. 3 illustrate an example swipe of the sphere 302 with a light pattern comprising a light line 304, in different time instances. More specifically, the time instance corresponding to view A precedes the time instance corresponding to view B, which in turn precedes the time instance corresponding to view C. In other words, the swipe of the object 302 with the line 304 occurs in a horizontal direction from right to left, as indicated by arrow 306. As shown in views B and C, the light line 304 may become distorted when it goes over the spherical surface of the sphere 302, due to the geometry of this particular object or due to the geometric setup of the system. Accordingly, the distances between an imaginary dot 310 on line 304 and the camera of the apparatus of FIG. 1 (which, although not shown, may be located on a plane perpendicular to the plane of the scene 301, e.g., looking into the page of FIG. 3) may be different in views A, B, and C. These distances may be calculated according to the techniques described in reference to FIG. 2.

Figure 4:
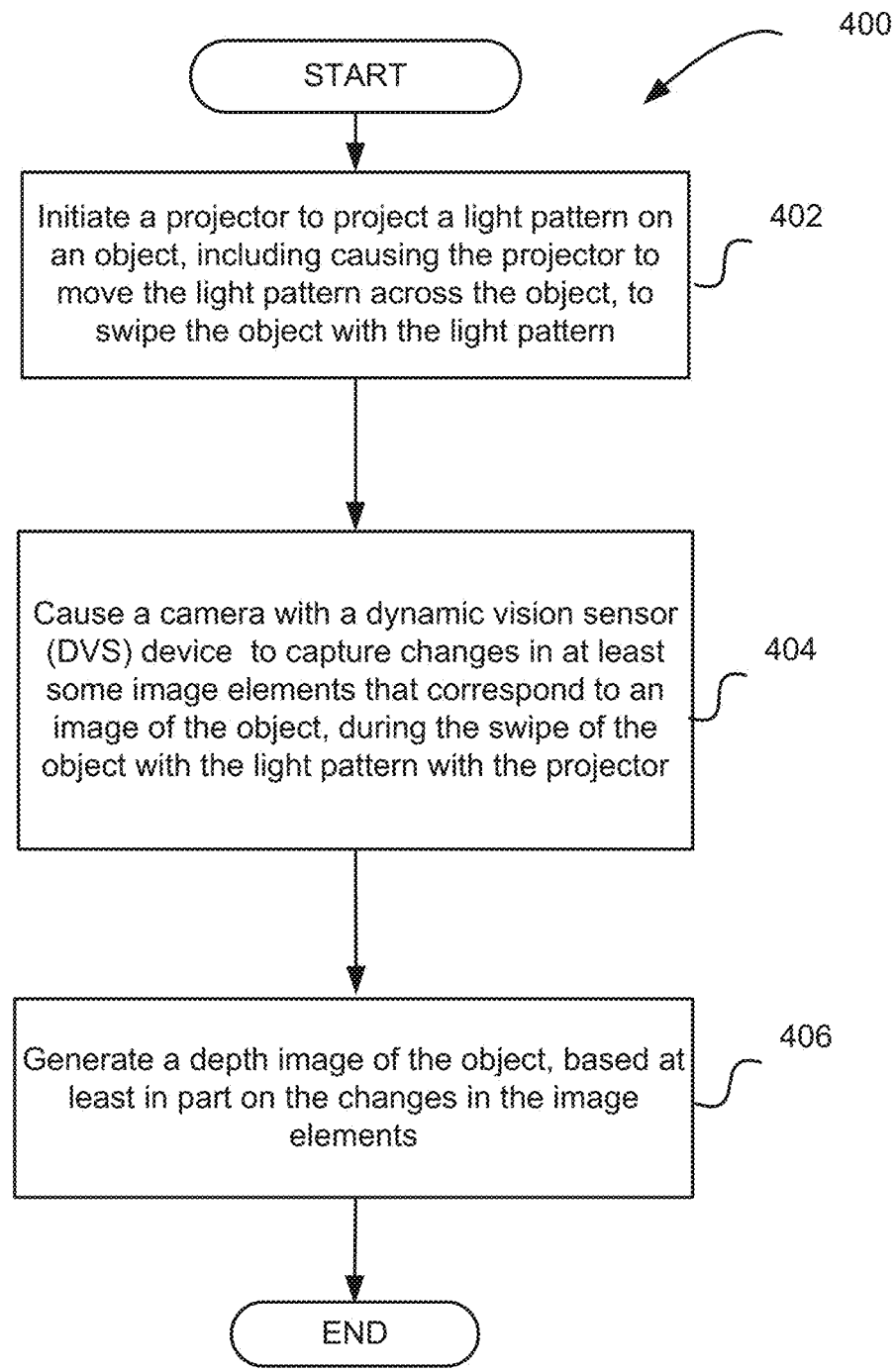
FIG. 4 illustrates a process for providing of a depth image of an object, in accordance with various embodiments.

FIG. 4 illustrates a process for providing of a depth image of an object, in accordance with various embodiments. The process 400 may be performed, for example, by the apparatus 100 described in reference to FIG. 1. More specifically, the process 400 may be performed by the processor 130 in response to execution of instructions to provide the depth image that may be stored in memory 134.

The process 400 may begin at block 402, and include initiating a projector (e.g., projector 104) to project a light pattern (e.g., lines 120) on an object (e.g., 110). This may include causing the projector to move the light pattern across the object, to swipe the object with the light pattern. The process 400 may include, prior to initiating the projector to project a light pattern, causing the projector to generate the light pattern comprising a substantially one-dimensional shape. The process 400 may further include synchronizing the projector with the camera, such as providing a common start time for a swipe cycle of the projector and the camera.

At block 404, the process 400 may include causing a camera (e.g., 102) with a DVS device (e.g., 106) to capture changes in at least some image elements that correspond to an image of the object, during the swipe of the object with the light pattern with the projector. This may include determining changes above a predetermined value in light intensity characteristics of the image elements (pixels).

At block 406, the process 400 may include generating a depth image of the object, based at least in part on the changes in the image elements. The generating of depth image may include calculating distances from the camera to the object for every image element with characteristics changed above or below a particular threshold, as discussed in reference to FIG. 2.

Figure 5:
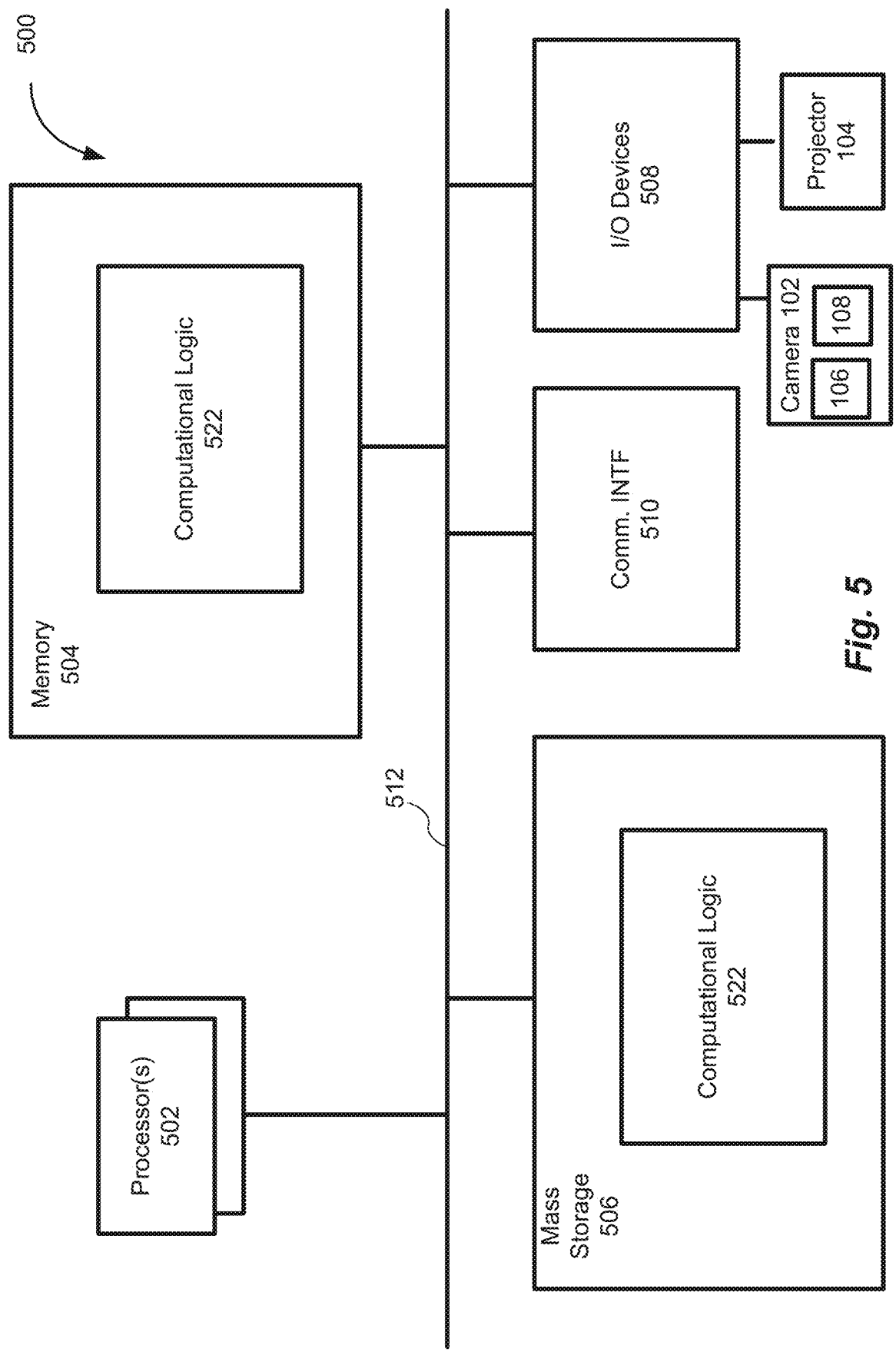
FIG. 5 illustrates an example of computing device 500 suitable for use to practice aspects of the present disclosure, in accordance with various embodiments.

FIG. 5 illustrates an example of computing device 500 suitable for use to practice aspects of the present disclosure, such as with an apparatus for provision of a depth image, in accordance with various embodiments. As shown, computing device 500 may include one or more processors or processor cores 502, and system memory 504. For the purpose of this application, including the claims, the terms "processor" and "processor cores" may be considered synonymous, unless the context clearly requires otherwise. The processor 502 may include any type of processors, such as a central processing unit (CPU), a microprocessor, and the like. The processor 502 may be implemented as an integrated circuit having multi-cores, e.g., a multi-core microprocessor.

The computing device 500 may include mass storage devices 506 (such as solid-state drives, volatile memory (e.g., dynamic random-access memory (DRAM)), and so forth). In general, system memory 504 and/or mass storage devices 506 may be temporal and/or persistent storage of any type, including, but not limited to, volatile and non-volatile memory, optical, magnetic, and/or solid state mass storage, and so forth. Volatile memory may include, but is not limited to, static and/or dynamic random-access memory. Non-volatile memory may include, but is not limited to, electrically erasable programmable read-only memory, phase change memory, resistive memory, and so forth. System memory 504 and/or mass storage devices 506 may include respective copies of programming instructions configured to perform operations related to apparatus 100, for example, collectively denoted as computational logic 522.

The computing device 500 may further include input/output (I/O) devices 508 (such as a display (e.g., display 132 of FIG. 1), soft keyboard, touch sensitive screen, image capture device, and so forth) and communication interfaces 510 (such as network interface cards, modems, infrared receivers, radio receivers (e.g., Near Field Communication (NFC), Bluetooth, WiFi, 4G/5G Long-Term Evolution (LTE)), and so forth). In embodiments, the computing device 500 may comprise, or include the components of, the apparatus 100 of FIG. 1. In some embodiments, the I/O devices may include camera 102 with DVS device 106 and lens 108, and projector 104, as described in reference to FIG. 1.

The communication interfaces 510 may include communication chips (not shown) that may be configured to operate the device 500 in accordance with a Global System for Mobile Communication (GSM), General Packet Radio Service (GPRS), Universal Mobile Telecommunications System (UMTS), High Speed Packet Access (HSPA), Evolved HSPA (E-HSPA), or LTE network. The communication chips may also be configured to operate in accordance with Enhanced Data for GSM Evolution (EDGE), GSM EDGE Radio Access Network (GERAN), Universal Terrestrial Radio Access Network (UTRAN), or Evolved UTRAN (E-UTRAN). The communication chips may be configured to operate in accordance with Code Division Multiple Access (CDMA), Time Division Multiple Access (TDMA), Digital Enhanced Cordless Telecommunications (DECT), Evolution-Data Optimized (EV-DO), derivatives thereof, as well as any other wireless protocols that are designated as 3G, 4G, 5G, and beyond. The communication interfaces 510 may operate in accordance with other wireless protocols in other embodiments.

The above-described computing device 500 elements may be coupled to each other via system bus 512, which may represent one or more buses. In the case of multiple buses, they may be bridged by one or more bus bridges (not shown). Each of these elements may perform its conventional functions known in the art. In particular, system memory 504 and mass storage devices 506 may be employed to store a working copy and a permanent copy of the programming instructions implementing the operations associated with the apparatus 100 of FIG. 1. The various elements may be implemented by assembler instructions supported by processor(s) 502 or high-level languages that may be compiled into such instructions.

The permanent copy of the programming instructions of computational logic 522 may be placed into permanent storage devices 506 in the factory, or in the field, through, for example, a distribution medium (not shown), such as a compact disc (CD), or through communication interfaces 510 (from a distribution server (not shown)). That is, one or more non-transitory distribution media having an implementation of the agent program may be employed to distribute the agent and to program various computing devices. In embodiments, the distribution media may be transitory, e.g., signals encoded with the instructions.

The number, capability, and/or capacity of the elements 508, 510, 512 may vary, depending on whether computing device 500 is used as a stationary computing device, such as a set-top box or desktop computer, or a mobile computing device, such as a tablet computing device, laptop computer, game console, or smartphone. Their constitutions are otherwise known, and accordingly will not be further described.

At least one of processors 502 may be packaged together with memory having computational logic 522 configured to practice aspects of embodiments described in reference to FIGS. 1-4. For one embodiment, at least one of processors 502 may be packaged together with memory having computational logic 522 to form a System in Package (SiP) or a System on Chip (SoC). For at least one embodiment, the SoC may be utilized to form the control module 140 of FIG. 1.

In various implementations the computing device 500 may comprise a laptop, a netbook, a notebook, an ultrabook, a smartphone, a tablet, a personal digital assistant (PDA), an ultra mobile PC, a mobile phone, a desktop computer, a server, a printer, a scanner, a monitor, a set-top box, an entertainment control unit, a digital camera, a portable music player, or a digital video recorder. In further implementations, the computing device 500 may be any other electronic device that processes data and that utilizes depth images of objects provided by the apparatus 100 of FIG. 1.

Example 1 may be an apparatus for generating depth images, comprising: a projector to project a light pattern on an object, and to move the projected light pattern over the object, to swipe the object with the light pattern; a camera coupled with the projector, wherein the camera includes a dynamic vision sensor (DVS) device, to capture changes in at least some image elements that correspond to an image of the object, during the swipe of the object with the light pattern; and a processor coupled with the projector and the camera, to generate a depth image of the object, based at least in part on the changes in the at least some image elements.

Example 2 may include the subject matter of Example 1, wherein the processor is to operate the projector to project a line pattern, and further to operate the camera to capture changes in the image elements, wherein to operate the projector and camera includes to synchronize the projector with the camera, wherein to synchronize includes to provide a common start time for a swipe cycle of the projector and the camera, and wherein to synchronize is further based at least in part on a location of the projected light pattern as a function of time.

Example 3 may include the subject matter of Example 1, wherein the camera includes an infrared (IR) camera.

Example 4 may include the subject matter of Example 1, wherein to project is to generate the light pattern, wherein the light pattern comprises a substantially one-dimensional shape.

Example 5 may include the subject matter of Example 4, wherein the light pattern comprises a substantially straight light line.

Example 6 may include the subject matter of Example 4, wherein the processor to swipe the object with the light pattern includes to move the light pattern across the object in a horizontal direction.

Example 7 may include the subject matter of any Examples 1 to 3, wherein the image elements comprise pixels.

Example 8 may include the subject matter of Example 7, wherein the DVS device to capture changes in at least some image elements includes to determine changes above a predetermined value in light intensity characteristics of the pixels.

Example 9 may include the subject matter of Example 8, wherein the processor to generate a depth image of the object is to compute a distance to the object for each pixel associated with the determined change in light intensity characteristics.

Example 10 may be a computing device-implemented method for generating depth images, comprising: initiating by a computing device, a projector to project a light pattern on an object, including causing the projector to move the light pattern across the object, to swipe the object with the light pattern; causing, by the computing device, a camera with a dynamic vision sensor (DVS) device to capture changes in at least some image elements that correspond to an image of the object, during the swipe of the object with the light pattern with the projector; and generating, by the computing device, a depth image of the object, based at least in part on the changes in the at least some image elements.

Example 11 may include the subject matter of Example 10, further comprising: synchronizing, by the computing device, the projector with the camera, wherein synchronizing includes providing a common start time for a swipe cycle of the projector and the camera.

Example 12 may include the subject matter of Example 10, further comprising: causing, by the computing device, to generate the light pattern comprising a substantially one-dimensional shape.

Example 13 may include the subject matter of any Examples 10 to 12, wherein causing the projector to move the projected light pattern across the object includes initiating the projector to move the light pattern across the object in one direction.

Example 14 may include the subject matter of Example 13, wherein the image elements comprise pixels, wherein causing a camera with a dynamic vision sensor (DVS) device to capture changes in at least some image elements includes determining, by the computing device, changes above a predetermined value in light intensity characteristics of the pixels.

Example 15 may include the subject matter of Example 14, wherein generating a depth image of the object includes determining, by the computing device, a distance to the object for each pixel associated with the determined change in light intensity characteristics.

Example 16 may be one or more non-transitory computing device-readable media having instructions for generating depth images stored, thereon that, in response to execution on a computing device, cause the computing device to: initiate a projector to project a light pattern on an object, wherein to initiate includes to cause the projector to move the light pattern across the object, to swipe the object with the light pattern; initiate, substantially simultaneously, a camera with a dynamic vision sensor (DVS) device, to capture changes in at least some image elements that correspond to an image of the object, during the swipe of the object with the light pattern with the projector; and generate a depth image of the object, based at least in part on the changes in the at least some image elements.

Example 17 may include the subject matter of Example 16, wherein the instructions further cause the computing device to provide a common start time for a swipe cycle of the projector and the camera.

Example 18 may include the subject matter of Example 16, wherein the instructions that cause the computing device to initiate a projection of a light pattern on an object further cause the computing device to generate the light pattern, wherein the light pattern comprises a substantially one-dimensional shape.

Example 19 may include the subject matter of Example 16, wherein the image elements comprise pixels, wherein the instructions that cause the computing device to initiate a camera with a dynamic vision sensor (DVS) device to capture changes in at least some image elements further cause the computing device to determine changes above a predetermined value in light intensity characteristics of the pixels.

Example 20 may include the subject matter of Example 16, wherein the instructions that cause the computing device to generate a depth image of the object further cause the computing device to determine a distance to the object for each pixel associated with the determined change in light intensity characteristics.

Example 21 may be an apparatus for generating depth images, comprising: means for initiating a projector to project a light pattern on an object, including causing the projector to move the light pattern across the object, to swipe the object with the light pattern; means for causing a camera with a dynamic vision sensor (DVS) device to capture changes in at least some image elements that correspond to an image of the object, during the swipe of the object with the light pattern with the projector; and means for generating a depth image of the object, based at least in part on the changes in the at least some image elements.

Example 22 may include the subject matter of Example 21, further comprising means for synchronizing the projector with the camera, wherein means for synchronizing includes means for providing a common start time for a swipe cycle of the projector and the camera.

Example 23 may include the subject matter of Example 21, further comprising means for causing to generate the light pattern comprising a substantially one-dimensional shape.

Example 24 may include the subject matter of any Examples 21 to 23, wherein means for causing the projector to move the projected light pattern across the object includes means for initiating the projector to move the light pattern across the object in one direction.

Example 25 may include the subject matter of Example 24, wherein the image elements comprise pixels, wherein means for causing a camera with a dynamic vision sensor (DVS) device to capture changes in at least some image elements includes means for determining changes above a predetermined value in light intensity characteristics of the pixels.

Example 26 may include the subject matter of Example 25, wherein means for generating a depth image of the object includes means for determining a distance to the object for each pixel associated with the determined change in light intensity characteristics.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the claims.

What is claimed is:

1. An apparatus, comprising:
a projector to project a light pattern on an object, and to move the projected light pattern over the object, so as to swipe the object with the light pattern, wherein the light pattern comprises a substantially one-dimensional shape, wherein to swipe the object with the light pattern includes to provide a single swipe of the object, which includes to move the one-dimensional shape in one direction, in continuous manner, over the object;
a camera coupled with the projector, wherein the camera includes a dynamic vision sensor (DVS) device, to capture changes in at least some image elements that correspond to an image of the object, during the swipe of the object with the light pattern; and
a processor coupled with the projector and the camera, to generate a depth image of the object, based on the single swipe of the object, and further based at least in part on the changes in the at least some image elements, wherein the depth image of the object comprises a plurality of depth images associated with corresponding image elements, wherein a depth image of an image element is proportionate to a focal length of the camera multiplied by a distance between the camera and the projector, and inversely proportionate to a distance between the object and a camera principle point in an image plane, and an angle between a direction of a projected line and a z-direction, at a time of identification of the image element.

2. The apparatus of claim 1, wherein the processor is to operate the projector to project the line pattern, and further to operate the camera to capture changes in the image elements, wherein to operate the projector and camera includes to synchronize the projector with the camera, wherein to synchronize includes to provide a common start time for a swipe cycle of the projector and the camera, and wherein to synchronize is further based at least in part on a location of the projected light pattern as a function of time.

3. The apparatus of claim 1, wherein the camera includes an infrared (IR) camera.

4. The apparatus of claim 1, wherein to project is to generate the light pattern.

5. The apparatus of claim 4, wherein the substantially one-dimensional shape of the light pattern comprises a substantially straight light line.

6. The apparatus of claim 1, wherein the one direction of movement of the one-dimensional shape comprises a horizontal direction.

7. The apparatus of claim 1, wherein the image elements comprise pixels.

8. The apparatus of claim 7, wherein the DVS device to capture changes in at least some image elements includes to determine changes above a predetermined value in light intensity characteristics of the pixels.

9. The apparatus of claim 8, wherein the processor is to compute a distance to the object for each pixel associated with the determined change in light intensity characteristics.

10. A computing device-implemented method, comprising:
  initiating, by a computing device, a projector to project a light pattern on an object, including causing the projector to move the light pattern across the object, so as to swipe the object with the light pattern, wherein the light pattern comprises a substantially one-dimensional shape, wherein to swipe the object with the light pattern includes to provide a single swipe of the object, which includes to move the one-dimensional shape in one direction, in continuous manner, over the object;
  causing, by the computing device, a camera with a dynamic vision sensor (DVS) device to capture changes in at least some image elements that correspond to an image of the object, during the swipe of the object with the light pattern with the projector; and
  generating, by the computing device, a depth image of the object, based on the single swipe of the object, and further based at least in part on the changes in the at least some image elements, wherein generating the depth image of the object includes generating a plurality of depth images associated with corresponding image elements, wherein a depth image of an image element is proportionate to a focal length of the camera multiplied by a distance between the camera and the projector, and inversely proportionate to a distance between the object and a camera principle point in an image plane, and an angle between a direction of a projected line and a z-direction, at a time of identification of the image element.

11. The computing device-implemented method of claim 10, further comprising: synchronizing, by the computing device, the projector with the camera, wherein synchronizing includes providing a common start time for a swipe cycle of the projector and the camera.

12. The computing device-implemented method of claim 10, further comprising: causing, by the computing device, to generate the light pattern, wherein the substantially one-dimensional shape of the light pattern comprises a straight line.

13. The computing device-implemented method of claim 10, wherein causing the projector to move the projected light pattern across the object includes initiating the projector to move the light pattern across the object in a horizontal direction.

14. The computing device-implemented method of claim 13, wherein the image elements comprise pixels, wherein causing a camera with a dynamic vision sensor (DVS) device to capture changes in at least some image elements includes determining, by the computing device, changes above a predetermined value in light intensity characteristics of the pixels.

15. The computing device-implemented method of claim 14, wherein generating the depth image of the object includes determining, by the computing device, a distance to the object for each pixel associated with the determined change in light intensity characteristics.

16. One or more non-transitory computing device-readable media having instructions stored thereon that, in response to execution on a computing device, cause the computing device to:
  initiate a projector to project a light pattern on an object, wherein to initiate includes to cause the projector to move the light pattern across the object, so as to swipe the object with the light pattern, wherein the light pattern comprises a substantially one-dimensional shape, wherein to swipe the object with the light pattern includes to provide a single swipe of the object, which includes to move the one-dimensional shape in one direction, in continuous manner, over the object;
  initiate, substantially simultaneously, a camera with a dynamic vision sensor (DVS) device, to capture changes in at least some image elements that correspond to an image of the object, during the swipe of the object with the light pattern with the projector; and
  generate a depth image of the object, based on the single swipe of the object, and further based at least in part on the changes in the at least some image elements, wherein the depth image of the object comprises a plurality of depth images associated with corresponding image elements, wherein a depth image of an image element is proportionate to a focal length of the camera multiplied by a distance between the camera and the projector, and inversely proportionate to a distance between the object and a camera principle point in an image plane, and an angle between a direction of a projected line and a z-direction, at a time of identification of the image element.

17. The one or more non-transitory computing device-readable media of claim 16, wherein the instructions further cause the computing device to provide a common start time for a swipe cycle of the projector and the camera.

18. The one or more non-transitory computing device-readable media of claim 16, wherein the instructions that cause the computing device to initiate a projection of a light pattern on an object further cause the computing device to generate the light pattern, wherein the substantially one-dimensional shape of light pattern comprises a straight line.

19. The one or more non-transitory computing device-readable media of claim 16, wherein the image elements comprise pixels, wherein the instructions that cause the computing device to initiate a camera with a dynamic vision sensor (DVS) device to capture changes in at least some image elements further cause the computing device to determine changes above a predetermined value in light intensity characteristics of the pixels.

20. The one or more non-transitory computing device-readable media of claim 16, wherein the instructions further cause the computing device to determine a distance to the object for each pixel associated with the determined change in light intensity characteristics.

* * * * *